United States Patent [19]

Wiklund

[11] Patent Number: 5,161,645
[45] Date of Patent: Nov. 10, 1992

[54] LUBRICATOR CONNECTED TO A PRESSURE FLUID LINE

[76] Inventor: Henry W. Wiklund, Bäckvägen 1, Arbrå, Sweden, S-820 10

[21] Appl. No.: 864,581

[22] Filed: Apr. 7, 1992

[51] Int. Cl.⁵ .............................................. F16N 7/30
[52] U.S. Cl. .................................... 184/55.1; 184/7.4; 222/389
[58] Field of Search ...................... 184/55.1, 55.2, 39, 184/39.1, 42, 7.4, 9, 26, 6.26; 222/389

[56] References Cited

U.S. PATENT DOCUMENTS

| | | | |
|---|---|---|---|
| 1,086,230 | 2/1914 | Schwend | 184/55.1 |
| 2,984,316 | 5/1961 | Malec | 184/55.2 |
| 3,115,949 | 12/1963 | Malec | 184/55.2 |
| 3,628,631 | 12/1971 | O'Leary | 184/55.2 |
| 5,000,291 | 3/1991 | Forster | 184/39 |

FOREIGN PATENT DOCUMENTS 0366105 4/1974 Sweden.

Primary Examiner—Ira S. Lazarus
Assistant Examiner—Alan B. Cariaso
Attorney, Agent, or Firm—Eric Y. Munson; Mark P. Stone

[57] ABSTRACT

A lubricator intended to feed lubricant, by a short impulse, to a pressure fluid line each time that tapping of pressure fluid is started. In the lubricator, a pressure fluid valve (29) is provided which, after a delay of a fraction of a second, is opened for the passage of pressure fluid when tapping is started. During the delay, a pressure drop results on one side of a lubricant valve (23) while simultaneously a higher pressure prevails in a lubricant reservoir (39) and imposes a movement on the lubricant valve during which lubricant is discharged.

1 Claim, 1 Drawing Sheet

LUBRICATOR CONNECTED TO A PRESSURE FLUID LINE

The present invention relates to a lubricator intended to be connected to a pressure fluid line, such as a compressed air line, and, by a short impulse, to feed a lubricant to the line each time a flow of pressure fluid is started on the starting of a pressure fluid operated device, such as a tool or a machine connected to the line downstream of the lubricator, whereby the lubricant, mixed with the pressure fluid, will be fed to the said device.

A typical field of applications for the lubricator in accordance with the invention is air tools. For the sake of simplicity it will therefore, in the following description, mainly be referred only to compressed air and air tools, which does not imply that the invention is limited to such tools, but it can also embrace other pressure fluid operated devices.

STATE OF THE ART

For the lubrication of air tools it is known to use different types of lubricators which feed oil to the air line all the time that air is flowing through it. As a rule, this results in the discharge of an oil quantity which is several times larger than that required for a satisfactory lubrication of the tool. The excess oil is blown through the tool and pollutes the air of the workroom. As the oil is fed out continuously, the contents of the oil reservoir are quickly used up, often in a few days only, whereupon it may take a long time before the lubricator is attended to and refilled. In practice, an alternation between a far too abundant lubrication and no lubrication at all is not uncommon.

Through the published Swedish patent application No. 366 105 a lubricator is known which functions in such a way that a small amount of oil is discharged momentarily on the starting of a tool connected to the same air line as the lubricator, but the discharge of oil does not continue during the whole time that the tool is operated, but is repeated only at the next start. With this lubricator, an unnecessarily large consumption of lubricant can be avoided. It is, however, impaired by certain disadvantages of a practical nature.

The function of the device is controlled by means of the small changes of pressure which occur at different points in it at the change-over from stand-still to flow, or vice versa, of the pressure fluid. How much the pressure changes is determined by the rate of flow, i.e. by the consumption of pressure fluid per unit of time. An air tool connected to the line which has a low air consumption will, when started, only cause a very unimportant pressure drop. The lubricator is therefore fitted with extremely sensitive and precision-demanding devices in the form of pressure regulators and a dosage piston which, based on the small pressure variations, is to perform movements between two end positions and which by means of a very exactly adjusted play between piston and cylinder walls is to determine a leakage past the piston of the correct amount of oil. In the specification, a suitable diameter difference between the piston and the surrounding chamber walls of only 0.005 mm is stated.

The precision-demanding devices make the lubricator expensive to manufacture. The extremely small pressure forces which, on the starting and stopping of tools which have a low air consumption, are available to affect the pressure regulators and the dosage piston make these sensitive to impurities in the oil, and furthermore the oil viscosity must keep within accurately defined limits in order that the feeding shall function.

SUMMARY OF THE INVENTION

The object of the present invention is to provide a lubricator of the kind referred to above which does not show the limitations described above for the known art, i.e. which can be manufactured in a simple and cheap way, without high demands for precision, and which has a reliable and not sensitive feeding-out function; this also including a capability of feeding lubricating oils of both high and low viscosity. This has been achieved with the lubricator in accordance with the invention such as it is defined in the Claims.

SHORT DESCRIPTION OF THE ACCOMPANYING DRAWING

An embodiment of the invention is described closer in the following under reference to the accompanying drawing.

FIG. 1 of the drawing shows a sectional side view of the lubricator.

FIG. 2 shows, also as a sectional side view, a portion of same with the devices related to its out-feed mechanism for lubricant in another position than that shown from FIG. 1.

DETAILED DESCRIPTION OF AN EMBODIMENT OF THE INVENTION

Figure 1:
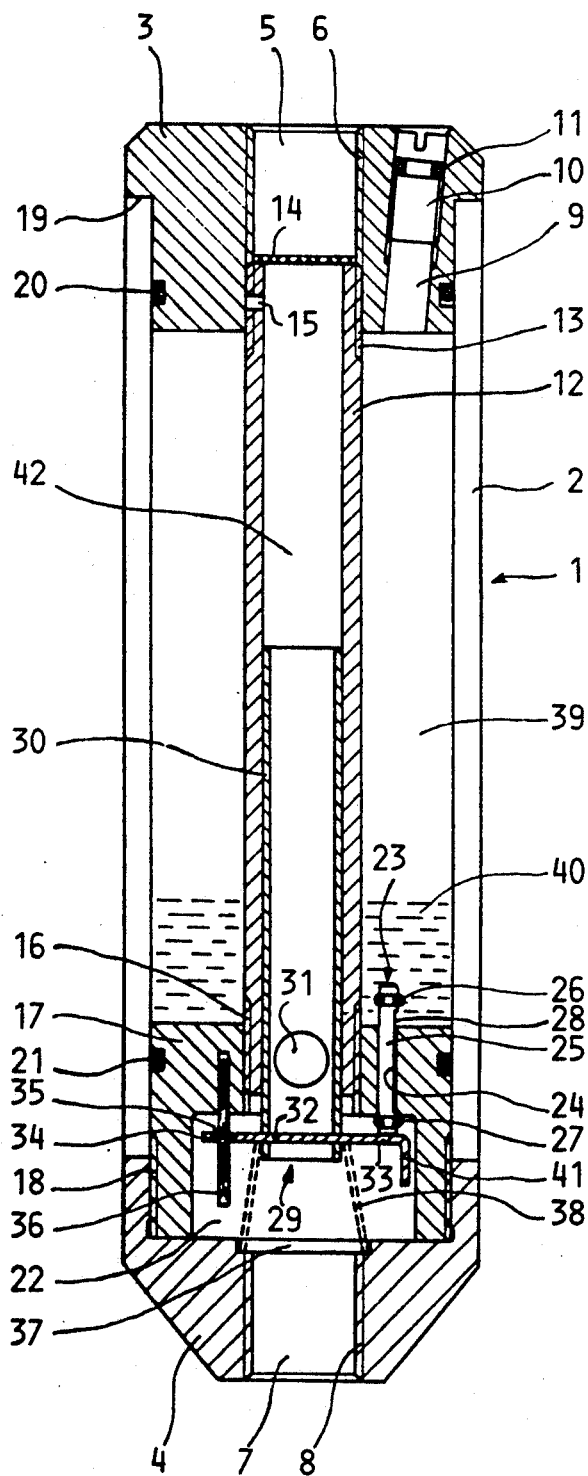

In accordance with the exemplified embodiment, the lubricator comprises a housing 1, the main parts of which consist of an outer tube 2, preferably of a transparent material, an inlet part 3 and an outlet part 4 intended for connection to a compressed air line. The inlet part 3 has an inlet opening 5 with a connection thread 6 for a coupling nipple of the common type for the said line, and in the corresponding way the outlet part 4 has an outlet opening 7 with a connection thread 8.

In the inlet part 3, a filling hole 9 for the lubricant is provided, as well as a screw 10 fitted with a seal ring 11 for sealing the hole. Furthermore, an inner tube 12 connects with the part 3 by means of a thread 13 which engages the thread 6 of said part. The end of the inner tube 12 which is screwed into the part 3 can be provided with a filter 14 to separate solid particles which may be present in the compressed air. In the wall of the inner tube, a hole 15 is provided.

In its end opposite to the inlet part 3, the inner tube 12 is, by means of a thread joint 16, fitted to a valve housing 17. The outlet part 4 is fastened to the valve housing by means of a thread joint 18. The outer tube 2 is, with one of its end portions, passed over the inlet part 3 and contacts, with its end surface, a shoulder 19 on the part. Between the tube and its portion which encloses the part 3, a seal ring 20 is provided. The other end portion of the outer tube 2 is passed over the valve housing 17 and contacts, with its end surface, an end surface of the outlet part 4. Between the tube and the valve housing a seal ring 21 is provided.

At its end facing away from the inner tube 12, the valve housing 17 is provided with a cavity considerably larger in diameter than the inner tube, which cavity together with an end surface of the outlet part 4 forms a chamber 22 which communicates with the inner tube and with the outlet opening 7. In the end wall of the cavity, a lubricant valve 23 is provided. The valve is formed by means of a hole 24 passing through the said end wall, and a dosage piston 25 which is passed through the hole and provided with seal rings 26, 27 fitted in grooves in the piston, the seal rings simultaneously serving as stops for limiting the movements of the piston. Along part of its length between the seal rings, the piston is provided with a groove or a planed portion 28.

In the inner tube 12 and the chamber 22, a pressure fluid valve 29 is provided. It consists of a valve tube 30, two opposite side walls of which are provided with holes 31. At one end, the valve tube is closed by a flat, oblong member 32 which is passed through slots in the tube and which protrudes side-ways from it at both ends. One end portion 33 of said member extends in front of one end of the dosage piston 25, and in order to prevent the member from turning from this position, a hole 35 is provided in its other end portion and is passed over a guide pin 36 fixed to the valve housing 17. Between the member 32 and a bore 37 in the outlet part 4, which bore serves as a spring guide, a weak compression spring 38 is provided. At its end facing the member 32, the spring is guided by a portion of the valve tube 30 which protrudes outside said member.

Between the outer tube 2 and the inner tube 12, a ring-shaped reservoir 39 for a lubricant 40 is formed. In the axial directions of the tubes, the reservoir is defined by the end surfaces facing each other of the inlet part 3 and the valve housing 17. The inner tube 12, the valve tube 30 and the chamber 22 form a continuous channel 42 for pressure fluid from the inlet opening 5 of the inlet part 3 to the outlet opening 7 of the outlet part 4.

MODE OF OPERATION AND ADVANTAGES OF THE DESCRIBED EMBODIMENT

When oil is to be filled into the reservoir 39, the lubricator must not be pressurized. The screw 10 is removed, filling is done through the hole 9 and the screw is tightened, the seal ring 11 thereby providing for pressure-tight sealing of the hole. The lubricator is connected to a compressed air line with the help of nipples which are screwed into the inlet opening 5 and the outlet opening 7.

When the air line—of which the inlet and outlet openings 5, 7, of the lubricator as well as the inner tube 12, the valve tube 30 and the chamber 22 are now forming part—is pressurized, the pressure will, via the hole 15 of the inner tube 12 and the thread joint 6, 13, which is not pressure tight, also affect the reservoir 39. In order to ensure the transmission of pressure without too much resistance in the thread joint, the hole 15 is located in it at a short distance from the reservoir 39. The thread joint is sufficiently tight, however, to prevent unintentional leakage of lubricant from the reservoir into the inner tube 12 if, when being handled for refilling purposes, the lubricator should be placed in an inclined or horizontal position. In the working position it should be placed substantially vertically, the inlet part 3 facing upwards.

When there is no flow of air in the air line, the valve mechanism of the lubricator is in the position shown from FIG. 1, i.e. with the valve tube 30 and its member 32 pushed back by the spring 38. The member 32 keeps the dosage piston 25 in its retarded position, so that its seal ring 27 is in contact with one end surface of the valve housing 17 and its planed portion 28 is inside the entrance of the hole 24 at the said end surface. The seal ring and the cylindrical surface of the piston at the end of the planed portion combine to seal the hole 24 against leakage of lubricant. The holes 31 of the valve tube are inside the inner tube 12 and are thus blocked by the latter.

When tapping of air is started at a point downstream of the lubricator, a brief, considerable pressure drop occurs in the chamber 22, since the supply of new air is prevented—the outlet holes 31 of the valve tube 30 being blocked and the end of the tube being covered by a portion of the member 32. The overpressure acting against the said portion causes the valve tube 30 to be moved forward rapidly against the action of the weak spring 38 until the outlet holes 31 are outside the end of the inner tube 12 and permit a discharge of air, whereby the pressure is equalized. In order to limit the movement of the valve, the member 32 can be provided with a stop 41 which contacts an end surface of the outlet part 4.

Simultaneously with the forward movement, during which the member 32 moves away from the end of the dosage piston 25, a considerably higher pressure is prevailing in the reservoir 39 than that in the chamber 22. The piston, which is now free from the member 32, is therefore pushed forward, and at the same time lubricant is forced out via the play between the planed surface of the piston and the hole 24 and enters the chamber 22 where the lubricant is caught and carried away by the flow of air.

The dosage piston 25 continues to move forward to the end position in which the end of the planed surface 28 which is closest to the seal ring 26 is inside the hole 24 and the end of the hole which faces the reservoir 39 is sealed both by the seal ring 26 and by the piston's unplaned portion which is, in the end position of the piston, inserted a short distance into the hole. There is now no further discharge of lubricant, but the piston will remain in this position as long as the tapping of air continues and, thereby, also the valve tube 30 with its member 32 is retained in its advanced position.

Figure 2:
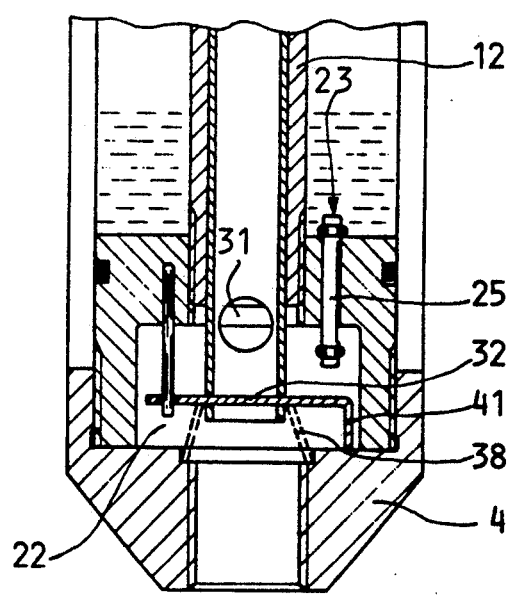

In the said end position (in accordance with FIG. 2), the dosage piston's 25 own weight contributes to retaining it, and in addition a small amount of overpressure is still acting on the end of it which faces the reservoir 39, even after the blocking of the holes 31 of the valve tube has ceased, since the resistance of the spring 38 results in a certain amount of pressure reduction in the chamber 22.

When the tapping of air is stopped, a complete equalization of pressure occurs at all points in the lubricator. The spring 38 returns the valve tube 30 and the member 32 to the starting position in accordance with FIG. 1, the member 32 simultaneously pushing back the dosage piston 25 into the position shown in the same Figure. During this movement, a certain leakage of lubricant can again occur past the planed portion 28 before the piston has reached its end position, but as no overpressure is during this phase acting on the lubricant, this contribution to the outfeed of lubricant is, on the whole, negligible.

As evident from the above, a discharge of lubricant occurs only during a fraction of a second while the dosage piston 25 is moving between its end positions. By adjustment of the stroke of the piston and the length and depth of the planed surface 28 it is possible to determine the dosage accurately and to obtain a very small dosage. With a reservoir volume of approx. 50 ml, an ordinary air tool can be furnished with a sufficient amount of lubricant during 4-6 months.

On the starting of a connected air tool, even one which has a low air consumption, the valve mechanism will always ensure a considerable pressure drop in the chamber 22. Therefore, ample power is available for the operation of the pressure fluid valve 29 as well as the lubricant valve 23 and for the forcing out of lubricant from the reservoir 39. Also, the force of the spring 38 can be adjusted with an ample margin for the returning of these small and light valves without any disadvantage in the form of an appreciable loss of pressure. Furthermore, no particularly high precision and fit is required, but the play between the sliding surfaces can be so adjusted that the movements are smooth. Therefore, the mechanism is not extremely sensitive to small particles acting as obstacles and is also able to feed out lubricants which have a considerably higher viscosity than those commonly used in oil mist lubricators and similar types. The lubricator in accordance with the invention will, in addition, be unexpensive to manufacture, thanks to its simple design and low precision requirements.

The outer tube 2 is suitably made from a transparent plastic material. This makes it possible to read off the lubricant level in the reservoir visually and to check visually the the feeding is functioning, i.e. that the dosage piston 25 moves downwards and upwards, respectively, each time a tapping of compressed air is started and stopped.

A fine-mesh filter cloth or the like 14 can suitably be provided at the inlet end of the inner tube 12, which is advantageous both for the functioning of the pressure fluid valve 29 and the functioning of an air tool connected to the air line.

As stated, a passage of air can be provided via the hole

As stated, a passage of air can be provided via the hole 15 and the thread joint 6, 13 in order to pressurize the reservoir 39. Through the same passage air will be exhausted when the lubricator is disconnected from the line. Therefore, there is no risk for the screw 10 being affected by pressure when it is loosened for the replenishment of lubricant. The thread joints 16 and 18, on the other hand, which connect inner tube and valve housing and valve housing and outlet part, should be made pressure tight.

The embodiment described, and shown from the attached drawing, is only an example, and within the scope of the invention, as defined by the Claims, considerable variations can be made of the design of the device, such as for example the shape and design of the housing 1, the location and design of the pressure fluid channel 42 leading through it, and of the reservoir 39 and the valve mechanism 23, 29.

I claim:

1. A lubricator connected to a pressure fluid line and intended to feed a lubricant, by a short impulse, to the line each time that a flow of pressure fluid is started towards a tapping point provided in the line downstream of the lubricator, said lubricator comprising a housing (1) with at least one pressure fluid channel (42) leading from an inlet opening (5) to an outlet opening (7) in said housing, a reservoir (39) provided in the housing for a lubricant (40), which reservoir is acted on by the pressure in the pressure fluid channel, and a lubricant valve (23) which communicates with the reservoir and with a portion (22) of said channel which connects with the outlet opening (7), characterized in that the lubricant valve (23) comprises a bore (24) which connects the reservoir (39) with the channel portion (22) connecting with the outlet opening (7) and in which a dosage piston (25) is arranged to be movable between a first and a second end position and to seal against the bore in both end positions but to have a non-sealing portion (28) therebetween and therefore permitting, when moving between the end positions, a discharge of lubricant from the reservoir (39), that in the pressure fluid channel (42) a pressure fluid valve (29) is movably arranged which, when there is no flow of pressure fluid through the line and the pressure fluid channel, is held, by a resilient retaining member such as a compression spring (38), in a position which blocks the channel (42), that the pressure fluid valve (29) simultaneously, with the help of a contact member (33) provided on said pressure fluid valve which is capable of contacting the dosage piston (25), retains said piston in its first end position, and that, when a flow of pressure fluid is started, it imposes on the pressure fluid valve (29) a movement to a position in which the channel (42) is freed, the contact member (33) simultaneously moving away from the dosage piston (25) and a pressure drop of short duration occuring, during the time required for said movement, in the portion (22) of the pressure fluid channel (42) which communicates with the lubricant valve (23), while simultaneously a higher pressure is prevailing in the reservoir (39) and imposes on the dosage piston (25) a movement towards its second end position, during which movement lubricant is discharged.

* * * * *